Figure 1:
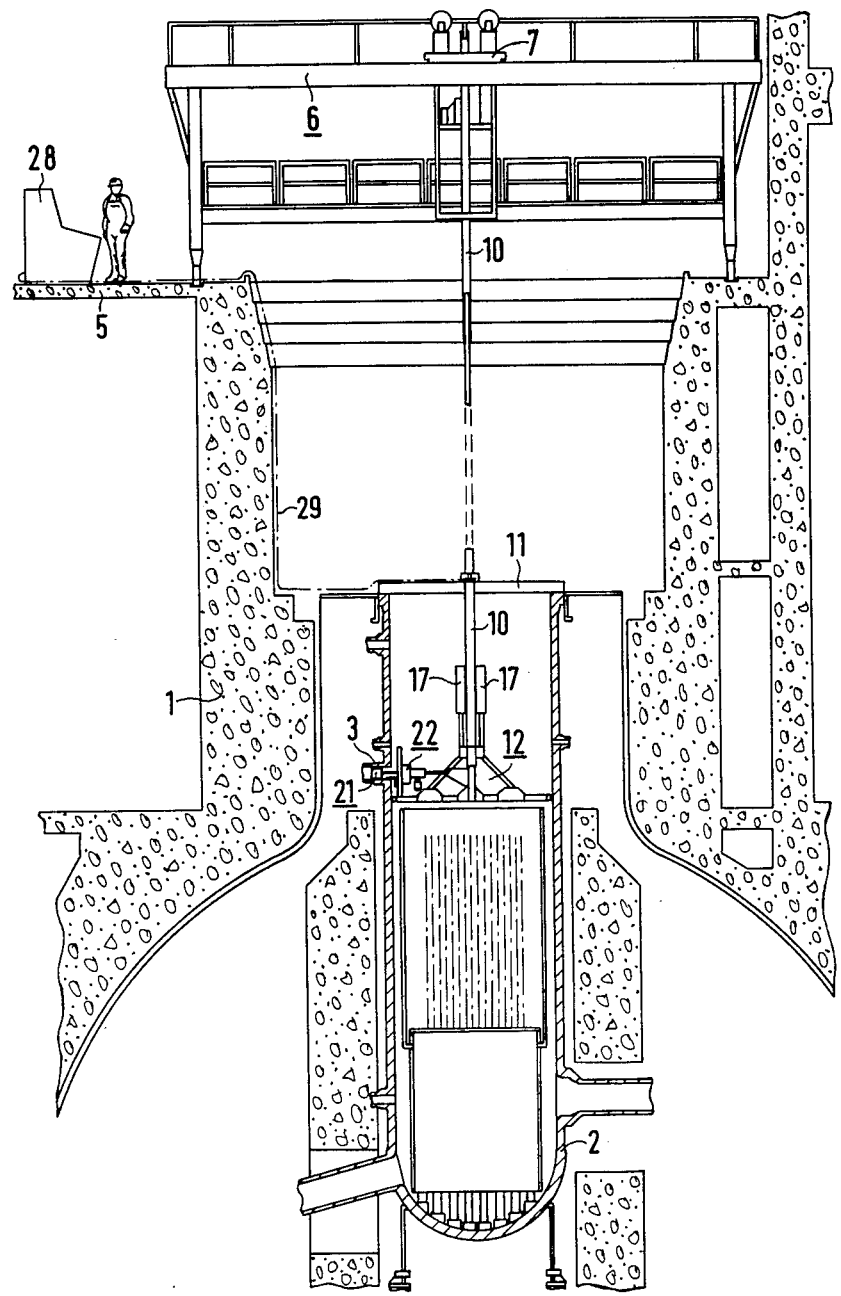

United States Patent [19]

Förner et al.

[11] Patent Number: 4,639,351

[45] Date of Patent: Jan. 27, 1987

[54] REPAIR DEVICE FOR A REACTOR PRESSURE VESSEL

[75] Inventors: Siegfried Förner, Erlangen; Erich Kätscher, Marloffstein; Stefan Ring, Erlangen, all of Fed. Rep. of Germany

[73] Assignee: Kraftwerk Union Aktiengesellschaft, Mülheim, Fed. Rep. of Germany

[21] Appl. No.: 590,691

[22] Filed: Mar. 19, 1984

[30] Foreign Application Priority Data

Mar. 23, 1983 [DE] Fed. Rep. of Germany ....... 3310947

[51] Int. Cl.⁴ .......................................... G21C 19/42
[52] U.S. Cl. ...................... 376/310; 376/260; 376/249; 376/258; 15/104.1 C
[58] Field of Search ............... 376/260, 308, 309, 310, 376/249, 258; 15/104.1 R, 104.1 C; 134/22.1, 125

[56] References Cited

U.S. PATENT DOCUMENTS

| | | | |
|---|---|---|---|
| 2,918,366 | 12/1959 | Buyers et al. | 376/309 X |
| 3,519,363 | 7/1970 | Ritcher et al. | 356/241 |
| 3,664,922 | 5/1972 | Diwinsky et al. | 176/19 R |
| 3,780,571 | 12/1973 | Wiesener et al. | 376/249 |
| 3,862,578 | 1/1975 | Schlüter | 73/432 R |
| 4,117,733 | 10/1978 | Gugel | 376/249 X |
| 4,244,296 | 1/1981 | Vertut | 15/104.05 X |
| 4,311,556 | 1/1982 | Iwamoto et al. | 376/249 X |
| 4,419,847 | 12/1983 | Duverne | 15/104.1 R X |
| 4,436,694 | 3/1984 | Vassalotti et al. | 376/310 |
| 4,452,753 | 6/1984 | Wentzell et al. | 376/260 X |
| 4,526,037 | 7/1985 | Wentzell et al. | 376/249 X |

FOREIGN PATENT DOCUMENTS 5871483 10/1981 Japan .................................. 376/260

*Primary Examiner*—Peter A. Nelson
*Attorney, Agent, or Firm*—Herbert L. Lerner; Laurence A. Greenberg

[57] ABSTRACT

A repair device for removing an inner surface layer on a feed-water connector of a reactor pressure vessel received in a reactor housing having an assembly platform with a carriage displaceable thereon transversely to the reactor pressure vessel, the repair device includes centering means located at a lower end of a telescopically extensible upright tube suspended from the carriage for centering the lower end of the upright tube in the pressure vessel, the centering means having at least two outwardly swingable supports and a hydraulic system for swinging the two supports outwardly umbrella-like; a supporting frame for a feed rod also disposed at the lower end of the upright tube, the feed rod being horizontally self-supporting at an end thereof; a drive motor connected to the feed rod for rotating the feed-rod; means located at the self-supporting end of the feed rod for centrally fixing the self-supporting end in the feed-water connector of the reactor pressure vessel; and a horizontally displaceable turning machine tool mounted on the feed rod, the turning machine tool having a face plate and a radially movable holder for a turning tool bit carried by the mounting support.

4 Claims, 2 Drawing Figures

REPAIR DEVICE FOR A REACTOR PRESSURE VESSEL

The present invention relates to a repair device by means of which cracked plating on a feed-water connector can be removed by remote control.

Industrial plants or installations are shut down at prescribed intervals so that highly stressed parts thereof may be inspected. In nuclear power stations, the feed-water connector on the reactor pressure vessel is one of these parts. As a result of thermal stresses occurring during operation, cracks may appear at the inner transition of the feed-water connector into the wall of the reactor pressure vessel, in which case, when the plant is inspected, the plating present thereat has to be removed and replaced by new plating.

It is accordingly an object of the invention to provide a repair device for removing an inner surface layer such as the plating on a feed-water connection of a reactor pressure vessel, which offers considerable improvement over heretofore known devices which merely inspect or check the surface layer.

With the foregoing and other objects in view, there is provided, in accordance with the invention, a repair device for removing an inner surface layer on a feed-water connector of a reactor pressure vessel received in a reactor housing having an assembly platform with a carriage displaceable thereon transversely to the reactor pressure vessel, the repair device comprising centering means located at a lower end of a telescopically extensible upright tube suspended from the carriage for centering the lower end of the upright tube in the pressure vessel, the centering means having at least two outwardly swingable supports and a hydraulic system for swinging said two supports outwardly umbrella-like; a supporting frame for a feed-rod also disposed at the lower end of the upright tube, the feed-rod being horizontally self-supporting at an end thereof; a drive motor connected to the feed rod for rotating the feed-rod; means located at the self-supporting end of the feed rod for centrally fixing the self-supporting end in the feed-water connector of the reactor pressure vessel; and a horizontally displaceable turning machine tool mounted on the feed-rod, the turning machine tool having a face plate and a radially movable holder for a turning tool bit carried by the mounting support.

In accordance with another feature of the invention the outwardly swingable supports have axially extensible feet.

In accordance with a further feature of the invention the movable holder for the turning tool bit has the shape of a pistol with the turning tool bit being disposed at a muzzle of the pistol.

In accordance with a concomitant feature of the invention the turning machine tool comprises tracer control means for detecting the geometrical contour of the surface to be machined, said turning tool bit-holder additionally including a three-dimension tracer, the tracer control means being coupled, via an electronic memory, with control means for controlling feed movement of the turning tool-bit.

Other features which are considered as characteristic for the invention are set forth in the appended claims.

Although the invention is illustrated and described herein as embodied in a repair device for a reactor pressure vessel, it is nevertheless not intended to be limited to the details shown, since various modifiactions and structural changes may be made therein without departing from the spirit of the invention and within the scope and range of equivalents of the claims.

Figure 2:
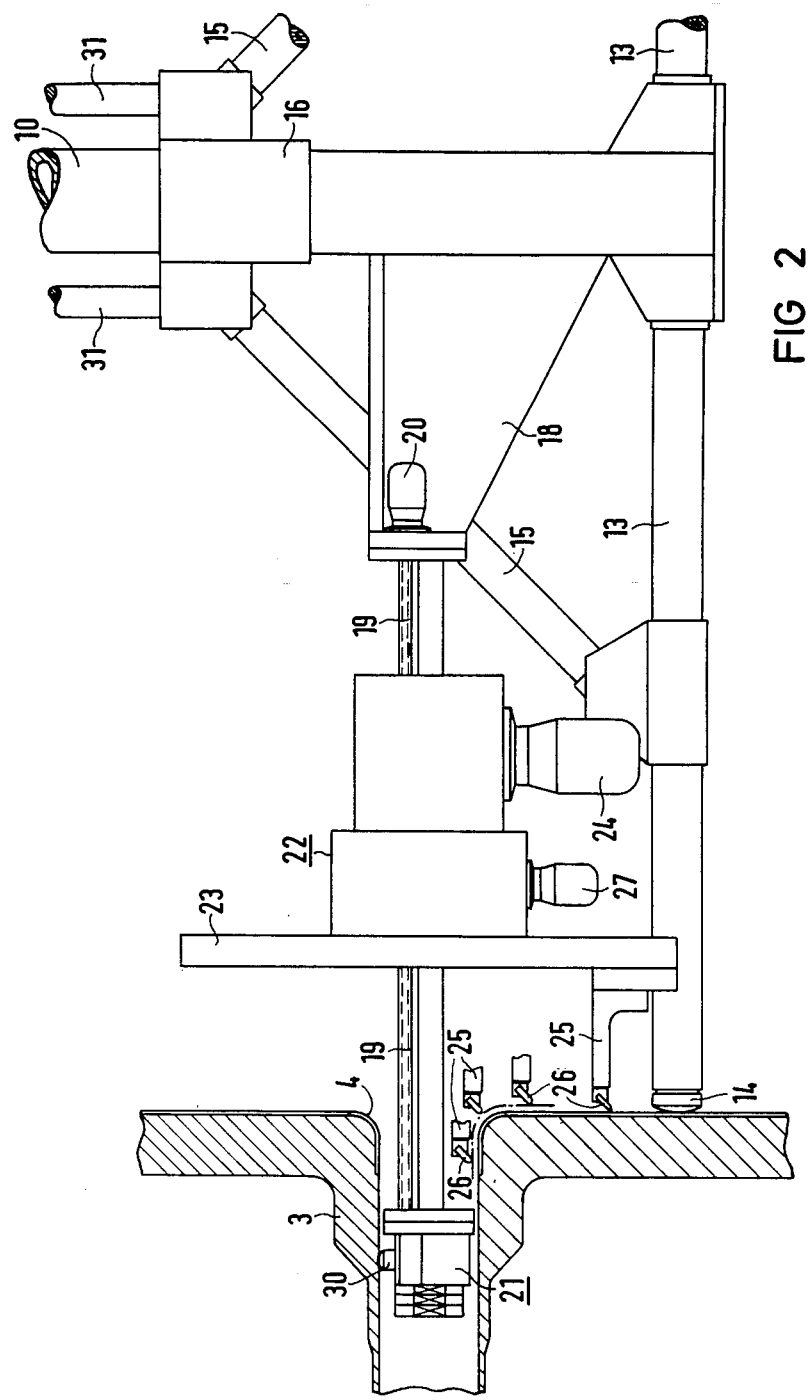

The construction and method of operation of the invention, however, together with additional objects and advantages thereof will be best understood from the following description of specific embodiments when read in connection with the accompanying drawings, in which:

FIG. 1 is a fragmentary diagrammatic vertical sectional view of a nuclear reactor installation having a reactor pressure vessel and a repair device therefor constructed in accordance with the invention; and FIG. 2 is an enlarged fragmentary view of FIG. 1 showing the repair device in greater detail.

Referring now to the drawing and, first, particularly, to FIG. 1 thereof, there is shown a reactor pressure vessel 2 located within a reactor housing 1. The vessel 2, which is accessible from above, has a feed-water connector 3 with a plating 4 provided on the inner surface thereof. An assembly platform 6, which includes a carriage movable diagonally over the circular opening of the reactor housing 1, is supported on a basin floor 5.

A standpipe 10, which is extensible telescopically and which is fixable in a pass-through of the assembly cover 11 of the reactor pressure vessel 2, is vertically suspended from a carriage 7 on the platform 6. A centering device 12 and a supporting frame 18 which supports a turning machine 22 are located at the lower end of the upright tube 10.

The centering device 12 is formed of two swiveling or swingable supports 13, which are secured articulatingly to the tube 10 and which have feet 14 which are extensible at the outer end thereof, as well as of intermediate levers 15, which are secured articulatingly to the supports 13 and to a sliding sleeve 16 which is slidable along the tube 10. Pistons 31 of two hydraulic pressure cylinders 17 act upon the sliding sleeve 16.

The supporting frame 18, in which a feed rod or draw spindle 19 is self-supportingly mounted horizontally, is secured to the lower end of the vertical pipe 10. The feed rod 19 is operated by a drive motor 20.

A fixing device 21 having three centering pistons 30 arranged uniformly distributed on the periphery of the device 21, although only one thereof is shown in FIG. 2, and having otherwise non-illustrated coordinated control valves is located at the self-supporting or free end of the feed rod 19. A lathe or other turning machine or machine tool 22, disposed on the feed rod 19 is centered by means of the centering device 21 relative to the feed-water connector or union 3 of the reactor pressure vessel 2.

The turning machine tool 22 is provided with a triaxial continuous-path tracer-control and is formed primarily of a face plate 23 having a drive motor 24 coordinated therewith, a pistol-like holder 25 for a turning tool bit 26, and an adjusting motor 27 for radially adjusting the holder 25.

A control desk or console 28, from which control cables and control lines 29 lead to the units of the repair device, is disposed on the floor 5 of the reactor housing, for operating the repair device. A non-illustrated television camera, by means of which coordination of the fixing device 21 and the turning machine or lathe 22 with the feed-water connector 3 can be monitored, is advantageously located at the lower end of the tube or pipe 10.

In preparation for the operation of the repair device, the latter is eccentrically driven into the reactor pressure vessel 2, with the centering device 12 in the retracted state thereof, and is gradually i.e. stepwise, introduced into the feed-water connector 3 by the fixing device 21. By extending the centering device 12 and loading or stressing the feet 14, which may likewise be extended, the whole device is centered and fixed in the reactor pressure vessel 2. By moving the turning machine or lathe 22 horizontally with the aid of the feed rod 19 and by moving the holder 25 radially, the whole critical region of the inner surface of the feed-water connector 3 can be reached. The pistol-like shape of the holder 25 and the clamping of the turning tool bit 26 at an angle of about 45 allows the turning machine or lathe to operate inside the connector 3, as is clearly suggested by the various positions of the turning tool bit 26 shown in FIG. 2.

In order to control the feed motion of the turning tool bit 26, initially the geometrical contour of the surface to be processed is electronically sketched with the aid of a three-dimension probe or tracer in the region of the feed-water connector 3, the probe or tracer being disposed on the pistol-like holder 25 of the turning tool bit 26. The electronically stored geometrical contour then serves for positioning the turning tool bit 26. Thus, the turning machine or lathe 22 has a tracer or probe control which is coupled by means of an electronic storage device to a control device for controlling the feed motion of the turning tool bit 26.

The foregoing is a description corresponding in substance to German Application P 33 10 947.8, dated Mar. 23, 1983, the International priority of which is being claimed for the instant application, and which is hereby made part of this application. Any material discrepancies between the foregoing specification and the aforementioned corresponding German application are to be resolved in favor of the latter.

We claim:

1. Repair device for removing an inner surface layer on a feed-water connector of a reactor pressure vessel received in a reactor housing having an assembly platform with a carriage displaceable thereon transversely to the reactor pressure vessel, the repair device comprising centering means located at a lower end of a telescopically extensible upright tube suspended from the carriage for centering said lower end of said upright tube in the pressure vessel, said centering means having at least two outwardly swingable supports and a hydraulic system for swinging said two supports outwardly umbrella-like; a supporting frame for a feed-rod also disposed at said lower end of said upright tube, said feed-rod being horizontally self-supporting at an end thereof; a drive motor connected to said feed rod for rotating said feed-rod; means located at said self-supporting end of said feed rod for centrally fixing said self-supporting end in the feed-water connector of the reactor pressure vessel, and a horizontally displaceable turning machine tool mounted on said feed rod, said turning machine tool having a face plate and a radially movable holder for a turning tool bit carried by said mounting support.

2. Repair device according to claim 1 wherein said outwardly swingable supports have axially extensible feet.

3. Repair device according to claim 1 wherein said movable holder for said turning tool bit has the shape of a pistol with said turning tool bit being disposed at a nuzzle of said pistol.

4. Repair device according to claim 1 wherein said turning machine tool comprises tracer control means for detecting the geometrical contour of the surface to be machined, said turning tool bit-holding additionally including a three-dimension tracer, said tracer control means being coupled, via an electronic memory, with control means for controlling feed movement of said turning tool-bit.

* * * * *